United States Patent [19]

Sirven

[11] Patent Number: 5,123,506
[45] Date of Patent: Jun. 23, 1992

[54] VALVE FOR HYDRAULIC FLUID AND SHOCK ABSORBER COMPRISING SUCH A VALVE

[76] Inventor: Jacques Sirven, 34, rue de l'Orangerie, F-78000 Versailles, France

[21] Appl. No.: 571,997

[22] Filed: Aug. 24, 1990

[30] Foreign Application Priority Data

Sep. 6, 1989 [FR] France .................. 89 11662

[51] Int. Cl.⁵ .............. F16F 9/50; F16K 17/34; B60G 17/08
[52] U.S. Cl. .............. 188/280; 188/322.15; 137/501
[58] Field of Search .......... 188/280, 281, 282, 322.15; 137/540, 501

[56] References Cited

U.S. PATENT DOCUMENTS

| | | | |
|---|---|---|---|
| 2,403,648 | 7/1946 | Focht | 188/280 |
| 2,697,496 | 12/1954 | McIntyre | 188/280 |
| 3,568,711 | 3/1971 | Katz | 188/280 X |
| 4,898,264 | 2/1990 | Miller | 188/280 X |

FOREIGN PATENT DOCUMENTS

| | | |
|---|---|---|
| 0003290 | 8/1979 | European Pat. Off. . |
| 0275503 | 7/1988 | European Pat. Off. . |
| 1505608 | 7/1970 | Fed. Rep. of Germany . |
| 2154882 | 5/1973 | France . |
| 621630 | 4/1949 | United Kingdom . |
| 2155584 | 9/1985 | United Kingdom . |
| 2189004 | 10/1987 | United Kingdom . |

*Primary Examiner*—Robert J. Oberleitner
*Assistant Examiner*—Peter M. Poon
*Attorney, Agent, or Firm*—Beveridge, DeGrandi & Weilacher

[57] ABSTRACT

The valve comprises a shutter (11) which cooperates with a seat (12), and a spring (13) tending to press the shutter onto the seat, so as to limit the flow rate of a hydraulic fluid passing through the valve. In order to vary the force exerted by the spring (13) on the shutter (11) as a function of the flow rate through the valve, the latter comprises a movable piston (14) on which the spring (13) bears, the movable piston being displaced in a cylinder (15) which it separates into two chambers (15a, 15b). One of these chambers is in communication with the hydraulic fluid downstream or upstream of the valve, the other chamber being in communication with an intermediate space (23) whose shutter (11) constitutes a first passage orifice and which is equipped, at a second passage orifice (24), with a restriction (25) defining a pressure drop which increases with the flow rate passing through it.

42 Claims, 7 Drawing Sheets

VALVE FOR HYDRAULIC FLUID AND SHOCK ABSORBER COMPRISING SUCH A VALVE

The present invention relates to a valve comprising a shutter which cooperates with a seat, and a spring tending to press the shutter onto the seat, so as to limit the flow rate of a hydraulic fluid passing through the valve. Such a valve may advantageously be used in a hydraulic shock absorber, in particular in a shock absorber for the suspension of a motor vehicle.

Valves of this type are frequently used in hydraulic damping devices, so as to define a damping force which increases with the relative displacement speed of the two parts of the shock absorber. Valves of this type may be mounted in such a way as to act during a compression movement of the rod of the shock absorber or during a pressure-reducing movement, or, alternatively, in both directions.

When such valves for hydraulic fluid are used, operating difficulties are frequently observed on the appearance of high-frequency vibrations, by reason of the fact that, for each shocklike movement requiring the opening of the valve in order to increase the flow rate of the hydraulic fluid passing through, the valve must pass from a completely closed or almost completely closed position to an open or substantially open position. The inertia of the valve, and in particular of the spring acting on the shutter of the valve in the direction of its seat, does not enable such vibrations to be suitably followed once the frequency exceeds a certain limiting value.

Moreover, the choice of the damping force value in a hydraulic shock absorber is always the result of a compromise which is difficult to find. In fact, it is necessary to limit the damping force during a shock absorber compression movement so that an abrupt shock, such as the passage of a wheel of the vehicle over an irregularity on the ground, does not cause too large an acceleration of the suspended mass as a whole.

It has already been proposed (European Patent Application 3290 (SIRVEN)) to arrange, in a vehicle shock absorber, a control valve which is pilot-operated by differential pressure, in a manner such that the valve opens during a rapid compression movement of the piston rod, thus bringing about a damping force which decreases starting from a predetermined limiting compression speed. In the shock absorbers of this type, certain difficulties are also observed during high-frequency vibrations, owing to a certain inertia of the pilot-operated control valve.

The subject of the present invention is a valve for the passage of hydraulic fluid which enables these disadvantages to be overcome. The subject of the invention is, in particular, such a valve which, used in a hydraulic shock absorber, makes it possible for the shutter of the valve to be placed at any moment in a position of equilibrium ready for opening, thus eliminating the problems encountered beforehand during high-frequency vibrations.

By the use of a valve according to the present invention, an instantaneous pilot operation of the control valve and the suppression of "bumps" during the opening of the valve, which is permanently located in a position of equilibrium ready for opening, is also obtained in a shock absorber of the type of that described in the abovementioned European patent application.

The subject of the invention is therefore essentially a valve of this type which makes it possible to obtain a filtering effect for the high pressure-variation frequencies, in particular when the valve is mounted in a hydraulic shock absorber.

The valve, according to the present invention, comprises a shutter which cooperates with a seat, and a spring tending to press the shutter onto the seat, so as to limit the flow rate of a hydraulic fluid passing through the valve, and means for varying the force exerted by the spring on the valve as a function of the flow rate through the valve.

The valve may, for example, comprise a movable piston on which the spring bears, the movable piston being displaced in a cylinder which it separates into two chambers. One of these chambers is in communication with the hydraulic fluid downstream or upstream of the valve, while the other chamber is in communication with an intermediate space whose shutter constitutes a first passage orifice and which is equipped, at a second passage orifice, with a restriction defining a pressure drop which increases with the flow rate passing through it.

In an advantageous embodiment, the communication of the hydraulic fluid with at least on of the abovementioned chambers is effected via additional restrictions for filtering high frequencies.

In one embodiment, one of the abovementioned chambers is in communication with the hydraulic fluid downstream of the valve and is arranged in such a way that the pressure of the hydraulic fluid located therein tends to decrease the force exerted by the spring on the shutter. The restriction defining the abovementioned limited passage is placed on the flow from the intermediate space, the hydraulic liquid penetrating into the said space via the shutter.

In another embodiment, one of the chambers is in communication with the hydraulic fluid upstream of the valve and is arranged in such a way that the pressure of the hydraulic fluid located therein tends to increase the force exerted by the spring on the shutter. The restriction defining the abovementioned limited passage is then placed upstream of the flow penetrating into the intermediate space, the hydraulic liquid escaping from the intermediate space via the shutter.

In every case, the restrictions may comprise a non-return valve.

By virtue of the arrangements of the present invention, the stress of the spring acting on the shutter varies as a function of the flow rate through the valve. This stress is low or even virtually non-existent when there is a zero flow rate, and increases with the flow rate. The rapid variations in the stress of the spring are avoided when a filtering restriction is interposed in the hydraulic fluid passage, as indicated above.

The valve, according to the present invention, may be used in all types of shock absorbers, in particular suspension shock absorbers for a motor vehicle of the type comprising a principal cylinder containing a hydraulic fluid, a principal piston actuated by a rod defining a first principal chamber and a second principal chamber in the cylinder, the said second principal chamber containing the rod and a fluid reservoir able to communicate with the first principal chamber. The passage of the hydraulic fluid from one principal chamber to the other is effected via a valve according to the invention, in which the stress of the spring varies as a function of the flow rate through the valve.

The valve may be mounted in the body itself of the shock absorber, for example in the principal piston of the shock absorber or in a partition element connected to the principal cylinder.

The valve of the invention may be used in a single-tube shock absorber or in a twin-tube shock absorber. It may be mounted so as to act during compression, pressure reduction or for both movements. In a shock absorber of the twin-tube type, the valve is mounted at one end of the principal cylinder, which cylinder is surrounded by an outer casing comprising the reservoir and defining with the principal cylinder an annular space. The valve of the invention may also be used in a hydropneumatic suspension.

Finally, the valve of the invention may be used as a pilot-operated control valve in a shock absorber whose damping force decreases, starting from a limiting displacement speed of the rod of the shock absorber. In this case, a control restriction is arranged between the first principal chamber and the reservoir of the shock absorber. The shutter of the valve is subjected to an additional force tending to close it and resulting from a substantially constant pressure of a reference gas, so as to bring about the opening of the valve during a rapid compression movement of the rod. The abovementioned additional force may be exerted directly on the shutter or, in an alternative, on the spring, then increasing the force exerted by the spring on the shutter.

The reference chamber comprises a movable wall which may be defined by an additional movable piston or by a flexible membrane, which has the advantage of not causing any friction.

However, if such a membrane is used, it may be advantageous, in order to increase the accuracy of regulating the damping force, to add to the membrane an additional piston defining a third chamber which is put in communication with the first principal chamber of the shock absorber. In this manner, the geometric characteristics of the valve remain accurately defined in spite of the use of a flexible membrane as movable wall of the reference chamber.

The reservoir of the shock absorber may, in part, contain a gas at the same pressure as the reference gas, a communication then being able to be established between the reservoir and a chamber containing the reference gas.

In an advantageous embodiment of a shock absorber of this type, an elastic unit is in addition mounted in the shock absorber, the fixing of the shock absorber being effected by the said elastic unit, in such a way as to cause the opening of the valve during a rapid compression movement of the rod.

The invention will be better understood by examining a few embodiments described by way of examples with no limitation being implied and illustrated by the accompanying drawings in which.

Figure 1:
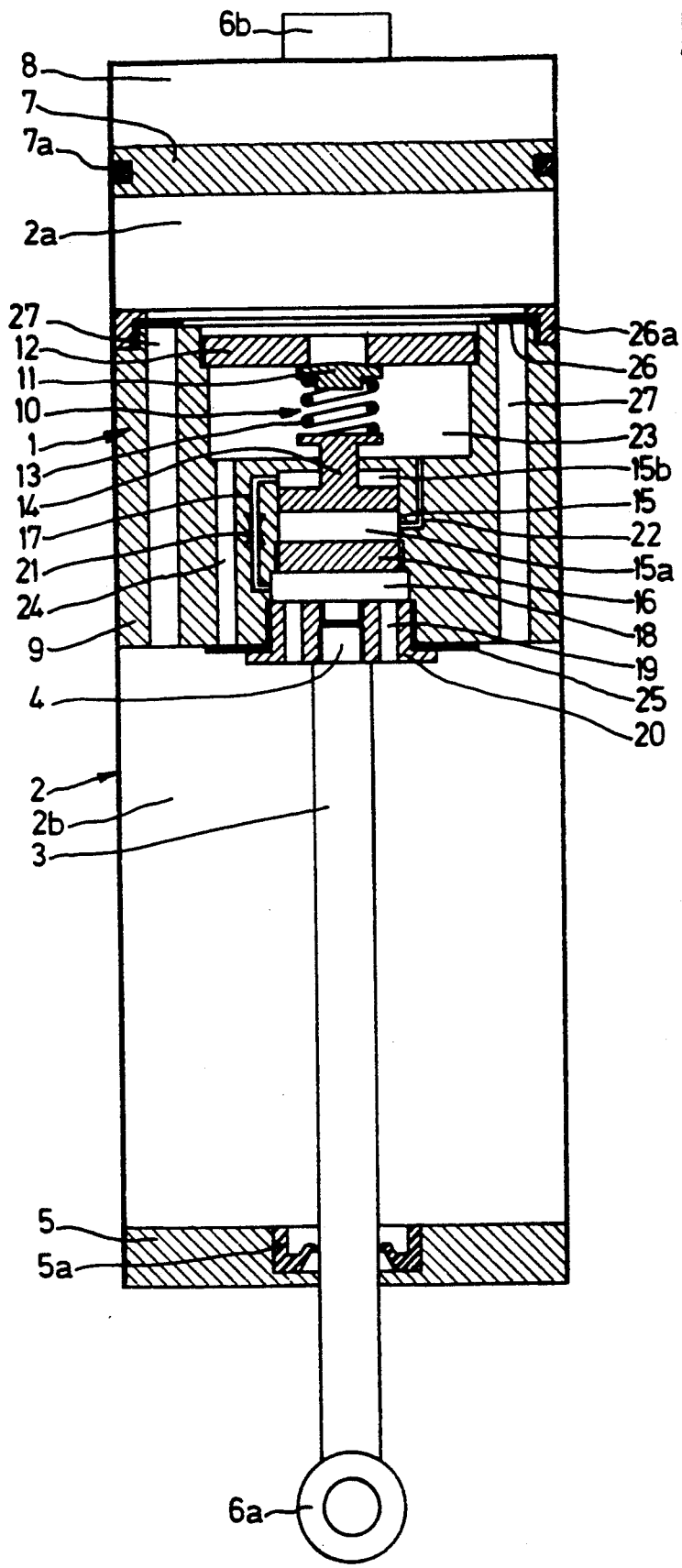
FIG. 1 is a diagrammatic cross-sectional view of a single-tube shock absorber comprising a valve according to the invention, mounted in the piston.

As is illustrated in FIG. 1, the shock absorber according to the present invention, which can be used in particular for a vehicle suspension, comprises a piston 1 which may slide within a cylinder 2 and defines in the latter a first principal chamber 2a, at the bottom of the piston 1, and a second principal chamber 2b which encloses the rod 3 secured to the piston 1, for example by means of its threaded end 4. The cylinder 2 is secured at its lower end to a closing piece 5, comprising a central bore equipped with a sealing ring 5a through which the rod 3 of the piston passes. At its free end, the rod 3 has, in the illustrated embodiment, a fastening ring 6a which may be connected to the wheel of the motor vehicle. At the opposite end, the cylinder 2 is closed and comprises a fastening element 6b, for example threaded, which may be fixed to the body of the vehicle. An auxiliary floating piston 7 is mounted in the first principal chamber 2a, so as to be able to slide in the cylinder 2 in a sealing manner, owing to the existence of a seal 7a which thus defines, in the upper part of the cylinder 2, a chamber 8 filled with a gas, such as air, and preferably pressurized.

The remainder of the cylinder 2 is filled with a hydraulic fluid, such as oil.

The piston 1 comprises a piston body 9 equipped with a certain number of passages for the hydraulic fluid and on the inside of which a valve is mounted, designated 10 as a whole, and mounted, in the illustrated example, in such a way as to permit a limited passage of hydraulic fluid from the first principal chamber 2a to the second principal chamber 2b, during a compression movement of the rod 3, causing the piston 1 to be displaced relative to the cylinder 2, from the bottom upwards in FIG. 1.

The valve 10 comprises a shutter 11 which is pressed against a seat 12 through the action of a helical compression spring 13. A movable piston 14 serves as a support for the spring 13. The movable piston 14 is displaced inside a cylinder 15 defined by a housing within the piston body 9 and closed off by a closing piece 16. The piston 14 separates the cylinder 15 into two chambers, the chamber 15a and the chamber 15b.

The chamber 15b is in communication via the passage 17 with a housing 18 of the piston body 9, which housing in turn communicates directly with the second chamber 2b via the passages 19 made in a threaded plug 20 fixed on the piston body 9 and by means of which the end 4 of the rod 3 is also fixed. A filtering restriction 21 is placed on the passage 17. Under these conditions, the chamber 15b is in communication, through the passages 17, 18 and 19 and via the restriction 21, with the second principal chamber 2b, which is located downstream of the valve 10 during the action of the latter at the moment of a compression movement of the rod 3. The hydraulic fluid pressure in the chamber 15b tends to decrease the stress of the spring 13.

The chamber 15a is connected by the passage 22 to an intermediate space 23 defined in the piston body 9, on the inside of which the spring 13, the shutter 11, as well as a portion of the piston 14 are located. The shutter 11, in combination with its seat 12, constitutes the inlet orifice for the hydraulic fluid in the space 23, emanating from the principal chamber 2a during a compression movement of the rod 3. Moreover, the intermediate space 23 may communicate with the second principal chamber 2b, via the passage 24 equipped with a non-return valve 25 which constitutes a restriction and which is fixed by means of the threaded plug 20. The hydraulic fluid pressure within the chamber 15a tends to increase the stress of the spring 13.

The piston body 9 comprises, in addition, passages 27 causing the second principal chamber 2b to communicate directly with the first principal chamber 2a, via a non-return valve 26 mounted on the piston body 9 by means of the threaded piece 26a and permitting a passage only during a pressure-reducing movement, the valve 26 serving to create the necessary damping force during such a pressure-reducing movement.

The functioning of the valve 10 according to the invention will now be described.

At rest, the prestressing of the spring 13 is low, the shutter 11 and the restriction 25 offering little resistance to the passage of the hydraulic fluid from the first principal chamber 2a to the second principal chamber 2b. However, this resistance increases steadily with the flow rate passing through the valve 10 and the restriction 25. The restriction 25 is chosen in such a way as to cause only a small pressure drop, even for large flow rates. The valve 11 and the force of the spring 13 are additionally advantageously regulated such that the damping force thus created directly is small and insufficient for the body of the vehicle to be correctly damped. The damping force complement is created by the action of the piston 14.

The various pressures prevailing in the shock absorber will now be defined:

$p_1$: pressure in the first principal chamber 2a;
$p_2$: pressure in the intermediate space 23, as well as in the first chamber 15a;
$p_3$: pressure in the second principal chamber 2b;
$p_4$: pressure in the second chamber 15b.

If, for the purpose of simplifying the statement, it is initially assumed that the restriction 21 plays no part, it can be seen that the piston 14 is subjected to the difference in the pressures $p_2$ and $p_3$, which tends to displace it upwards in FIG. 1 and, consequently, to compress the spring 13, which causes a pressure drop across the valve 10, that is to say between the shutter and its seat 12.

If S is the useful cross-section of the piston 14 and s the cross-section of the shutter 11, the following relationship is obtained:

$$p_1 - p_2 = S/s(p_2 - p_3).$$

In practice, the S/s ratio may be large, of the order of 5 to 10.

Figure 2:
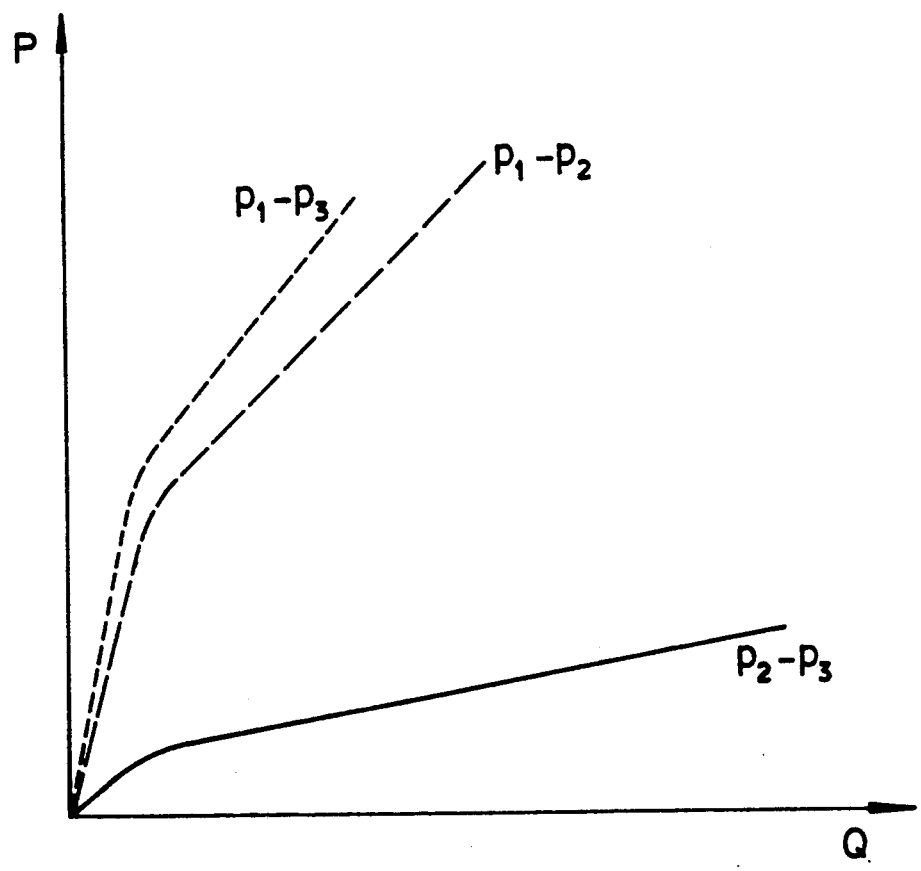
FIG. 2 illustrates the variation curves of certain differences in pressure of the fluid located in the shock absorber, as a function of the flow rate which passes through the valve of the shock absorber illustrated in FIG. 1.

The variation in the differential pressure $p_1 - p_2$ as a function of the flow rate Q through the valve 10 can be seen by dashed lines in FIG. 2. The total pressure drop across the valve 10 is represented by $p_1 - p_3$, which is also shown in FIG. 2 and is the sum of the differential pressures $p_1 - p_2$ and $p_2 - p_3$.

It will be noted that this characteristic is obtained in particular by virtue of the rigidity of the valve 25.

If the action of the restriction 21 illustrated in FIG. 1 and arranged on the passage 17 is now considered, it is seen that the effect of this restriction is to brake the movements of the piston 14 and therefore the pressure variations of the spring 13.

For a movement of the body of the vehicle at a frequency of the order of 1 to 1.5 Hz and of high amplitude, the restriction 21 has little effect and the differential pressure $p_1 - p_2$ is proportional to the differential pressure $p_2 - p_3$, as illustrated in FIG. 2. An excellent damping of the body of the vehicle is obtained.

During a rapid shock, the differential pressure $p_2 - p_3$ varies very quickly but remains low, and the piston 14 is virtually not displaced for the duration of the percussion. The differential pressure $p_1 - p_2$ is virtually constant for the total duration of the percussion which, consequently, is not transmitted by the shock absorber to the body of the vehicle. The pressure which creates the damping force is the sum of these two differential pressures. The first follows all the variations in the flow rate through the valve 10, and therefore in the relative movement of the wheel in respect of the body in the vehicle, but its value remains low. The second is much higher, but filtering has relieved it of all its high-frequency variations.

The particular structure of the valve 10 with its piston 14, combined with the filtering restriction 21, therefore makes it possible to achieve the elimination of the vibrations frequently encountered in shock absorbers of conventional type during rapid high-frequency shock.

Moreover, even when the additional filtering restriction 21 is omitted, the existence of the piston 14 which brings about a variation in the stress applied to the spring 13 makes it possible to arrange for the shutter 11 to always be in a position of equilibrium ready for opening, which notably improves the operating of the shock absorber.

In comparison with the embodiment illustrated in FIG. 1, it is possible to carry out a certain number of structural modifications without the result being substantially modified thereby. Thus the filtering restriction 21, instead of being placed on the passage 17, may be placed on the passage 22. It is also possible to provide a filtering restriction on the two passages 17 and 22. In practice, these restrictions may consist of several orifices of small diameter, some of which may comprise non-return devices or valves which totally prevent the hydraulic fluid from passing in one direction. In this way it is possible to brake the piston 14 when it tends to compress the spring 13 and when it reduces the stress of the spring 13, or to provide other controls so as to obtain the opposite effect.

Figure 3:
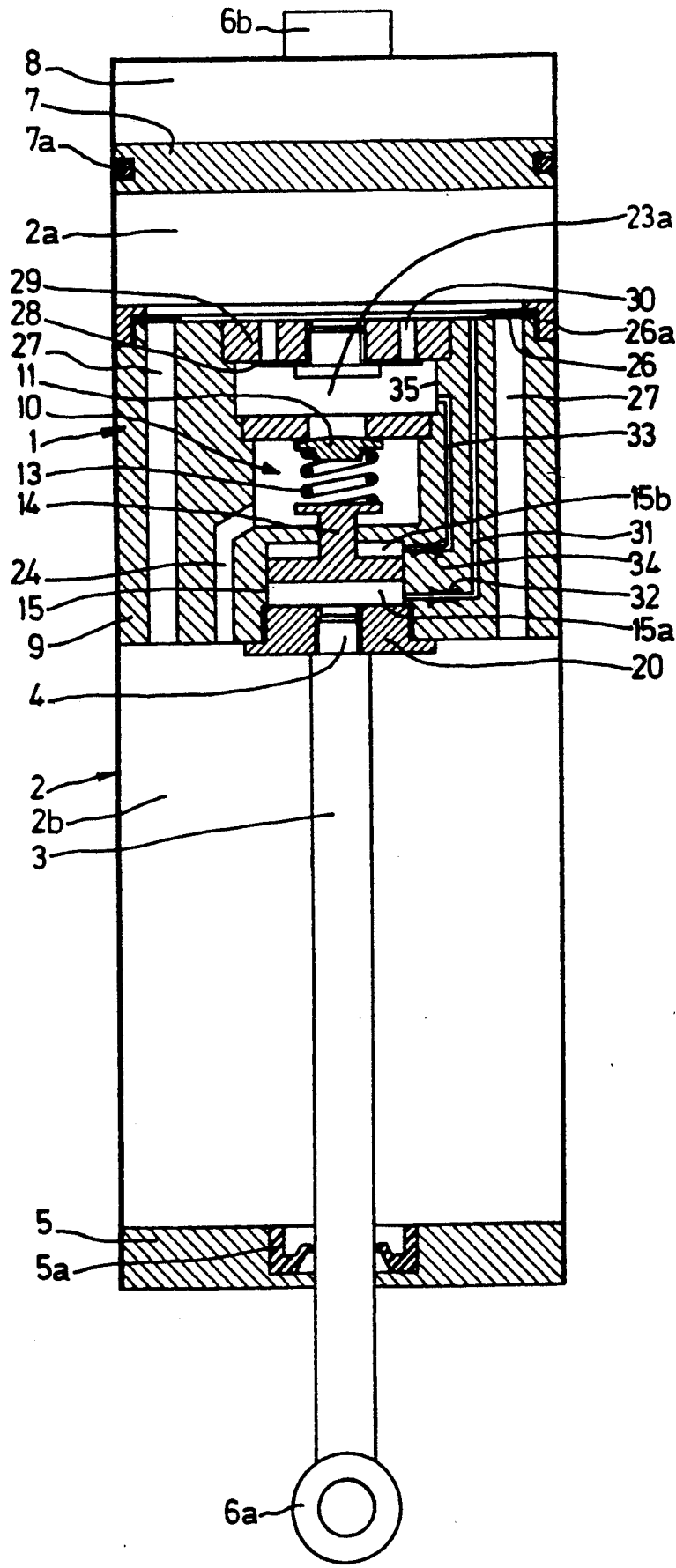
FIG. 3 is a diagrammatic cross-sectional view similar to FIG. 1 of an alternative single-tube shock absorber equipped with a valve according to the invention.

In the embodiment illustrated in FIG. 1, the restriction 25 is situated downstream of the shutter 11 of the valve 10. In contrast, it is possible to arrange for such a restriction upstream of the valve 10. FIG. 3 illustrates such an embodiment. In this figure where the identical elements bear the same references, a non-return valve 28 is in fact mounted upstream of the valve 10 on a closing piece 29 fixed to the piston body 9 and comprising passages 30, so as to enable a passage of hydraulic fluid emanating solely from the first principal chamber 2a, towards the second principal chamber 2b, by passing through the valve 10, the intermediate space 23 and the passage 24 which this time leads out directly therefrom, without any restriction, into the second chamber 2b.

In this embodiment, the chamber 15a is in communication via the passage 31 equipped with a filtering restriction 32, with the first principal chamber 2a, that is to say upstream of the non-return valve 28. The pressure prevailing in the chamber 15a tends to increase the stress of the spring 13. The second chamber 15b is in communication, via the passage 33 comprising the filtering restriction 34, with the housing 35 of the piston body 9 situated upstream of the shutter 11 and downstream of the non-return valve 28. The pressure prevailing in the chamber 15b tends to decrease the stress of the spring 13.

It will be noted that the terms "downstream" and "upstream" used in the present description correspond to the displacement of the hydraulic fluid during a compression movement of the piston 1 in the cylinder 2.

The operating of the shock absorber illustrated in FIG. 3 does not differ substantially from that of the shock absorber illustrated in FIG. 1. As above, the movements of the piston 14 which depend on the flow rate through the valve 10 make, it possible for the stress of the spring 13 to be varied. Moreover, in the case where the filtering restrictions 32 and 34 are provided as illustrated, a filtering of the high-frequency vibrations is obtained.

In the embodiments illustrated in FIGS. 1 and 3, the restriction 25 or 28 has the same flow rate of hydraulic fluid passing through it as the valve 10. However, it is possible to arrange that only a constant fraction of the flow rate through the valve 10 passes through the restrictions in question.

Figure 4:
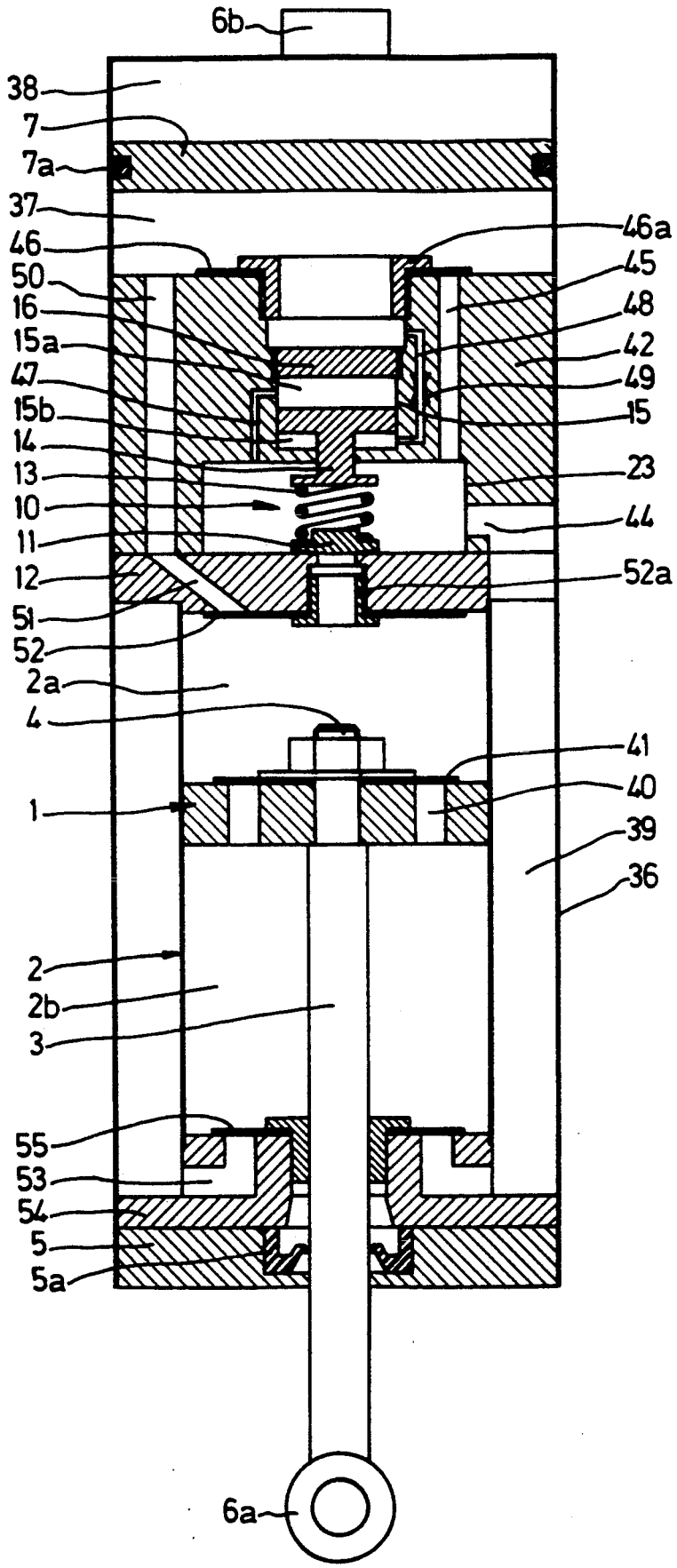
FIG. 4 is a diagrammatic cross-sectional view of an embodiment of a twin-tube shock absorber equipped with a valve according to the present invention.

FIG. 4 illustrates an embodiment of such a variant applied to a twin-tube shock absorber.

In this embodiment, where the identical elements bear the same references, the principal cylinder 2 is surrounded by an outer casing 36 which defines in its upper part a hydraulic fluid reservoir 37 also comprising a part 38 filled with a gas, such as air, delimited by the floating piston 7 An annular space 39 is defined between the principal cylinder 2 and the cylindrical outer casing 36.

The piston 1 fixed to the end of the rod 3 here simply comprises passages 40 connected to a non-return valve 41 for the passage of the hydraulic fluid from the second principal chamber 2b to the first principal chamber 2a, during a pressure-reducing movement of the rod 3.

Here the valve 10 of the present invention is mounted in an upper closing piece 42 fixed on the inside of the outer casing 36 and closing off the annular space 39. The piece 42 has a housing defining the cylinder 15, on the inside of which the piston 14 modifying the stress of the spring 13 is displaced as before. The arrangement of these pieces is inverted compared with the embodiments of FIGS. 1 and 3 such that, during a compression movement of the piston 1, the hydraulic fluid may pass from the first principal chamber 2a to the annular space 39 on the one hand, and the reservoir 37 on the other hand, by passing through the intermediate space 23. To this end, the intermediate space 23 communicates via the passage 44 with the annular space 39, and a passage 45 is provided in the piece 42 for the hydraulic fluid in the direction of the reservoir 37, this passage cooperating with the restriction made here in the form of a non-return valve 46 which permits the passage of the fluid only in this direction, that is to say towards the reservoir 37. The valve 46 is fixed by means of a nut 46a.

Here the first chamber 15a is in communication via the passage 47 with the intermediate space 23. The pressure prevailing therein tends to increase the stress of the spring 13. The second chamber 15b communicates, via the passage 48 equipped with a filtering restriction 49, with the reservoir 37. The pressure prevailing therein tends to decrease the stress of the spring 13.

The shock absorber is completed by passages 50 and 51 cooperating with a non-return valve 52 which is fixed to the closing piece 42 by means of the seat 12 and the nut 52a. A communication for hydraulic fluid is thus made possible from the reservoir 37 to the first principal chamber 2a and solely in this direction, during a pressure-reducing movement of the piston 1. Moreover, passages 53 made in a lower closing piece 54 and cooperating with a non-return valve 55 make possible a passage of the hydraulic fluid from the annular space 39 to the second principal chamber 2b during a compression movement.

In the embodiment illustrated in FIG. 4, only the portion of hydraulic fluid driven towards the reservoir 37 by the rod 3 pushing into the principal cylinder 2 passes through the restriction constituted by the non-return valve 46. This flow of fluid through the valve 46 brings about a pressure difference between the two faces of the piston 14 which acts on the spring 13 and the valve 10, as in the preceding embodiments.

Although a valve 10 mounted in such a way as to act during a compression movement has been shown in all the illustrative embodiments, it will be understood that the same valve may be mounted in such a way as to act during a pressure-reducing movement of the piston. Although the valve of the invention has been shown actually inside the principal piston or in the body of the shock absorber, it will be understood that it may also be mounted in a separate element connected by means of channels to the suspension cylinder itself.

The valve of the invention may also be applied to shock absorbers in which the damping force decreases when the compression speed exceeds a pre-determined limit.

Figure 5:
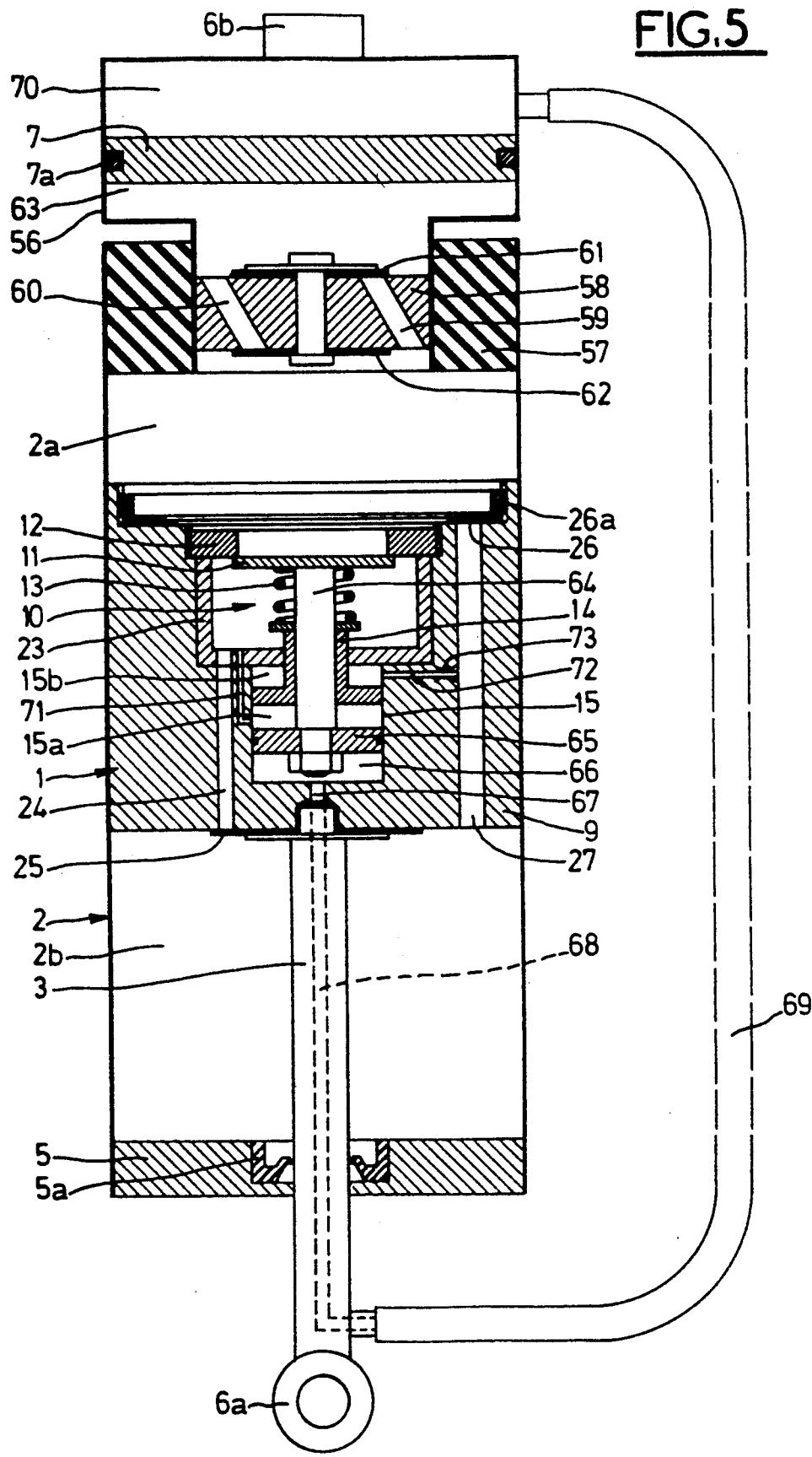
FIG. 5 is a diagrammatic cross-sectional view of another embodiment of a single-tube shock absorber, in which the control valve mounted in the piston is a pilot-operated valve.

FIG. 5 illustrates an example of such an embodiment. In this example, where the identical elements bear the same references, the cylinder 2 is fixed to the reservoir 56, itself secured to the body of the vehicle, by means of an annular elastic unit 57 made for example of synthetic rubber or elastomer. A closing piece 58 comprises passages 59 and 60 cooperating respectively with non-return valves 61 and 62 so as to permit the passage of the hydraulic fluid in one direction only, between the part 63 of the reservoir 56 containing hydraulic fluid and the first principal chamber 2a. The non-return valve 61 defines a control restriction causing the pilot operation of the valve 10 during a rapid compression movement.

Here the shutter 11 of the valve 10 of the invention is secured to a rod 64 which passes axially through the movable piston 14 and is fixed at its lower end to an additional piston 65 which may slide in a sealing manner inside the cylinder 15. The lower part of the cylinder 15 thus defines a reference chamber 66 which is filled with a gas, such as air, at a substantially constant pressure or reference pressure. The reference chamber 66 communicates, via the passage 67 and via a duct 68 placed axially in the rod 3, with an outer flexible duct 69, which in turn communicates with the upper part 70 of the reservoir 56 filled with gas, such as air. Under these conditions, the upper part of the reservoir 56 is at the same pressure as the reference chamber 66.

Also found in this embodiment is a passage 71 causing the chamber 15a to communicate with the intermediate space 23, and a passage 72 having a filtering restriction 73 causing the second chamber 15b to communicate with the second principal chamber 2b, by leading out into the passage 27 made in the body 9 of the piston 1. The passage 27 cooperates, as in the embodiments illustrated in FIGS. 1 and 3, with the non-return valve 26 during a pressure-reducing movement.

In this embodiment, the shutter 11 of the valve 10 is subjected to the action of the spring 13, tending to close the said shutter. The spring 13 is stressed by the movable piston 14. On the other hand, the additional piston 65 is subjected to the constant gas pressure which prevails in the reference chamber 66 and also tends to close the shutter 11. The valve 10 of the invention therefore here plays the additional role of a pilot-operated control valve, as already described in European Patent Application 3290 (SIRVEN). By virtue of this arrangement, a decrease in the damping force is obtained beyond a certain compression speed. Moreover, during a sudden compression, the elastic unit 57 partly penetrates inside the first chamber 2a, before any compression displacement of the rod, while decreasing the useful volume of the said chamber, which brings about an increase in the hydraulic fluid pressure prevailing in the said chamber and therefore an action on the control valve 10 pilot-operated by means of the additional piston 65.

For more information on the functioning of this pilot-operated control valve, reference may be made to the abovementioned European patent.

Moreover, by virtue of the arrangement according to the invention, the stress of the spring 13 varies as a function of the flow rate through the valve 10 which notably improves its functioning, In fact, the shutter 11 of the valve 10 is always in a position of equilibrium ready for opening.

Although the existence of a filtering restrictions 73 on the passage 72 has been provided in the embodiment illustrated in FIG. 5, it will be noted that this restriction is not indispensable in this shock absorber structure.

The forces acting on the shutter 11 in FIG. 5 are as follows:

the force R of the spring 13 tending to close the shutter;
the hydraulic force $p_1 S$ tending to open it;
the hydraulic force $p_2(S-s)$ tending to close it;
the hydraulic force $p_4 s$ tending to close it.

With $p_1$: pressure in the first principal chamber 2a and in the chamber 15b.
$p_2$: pressure in the intermediate space 23 and in the chamber 15a.
$p_4$: pressure in the reference chamber 66, created by the existence of the restriction 61.
S: cross-section of the shutter 11.
s: cross-section of the additional piston 65.

Another distribution of the forces to show the differential pressure $(p_1-p_2)$ which determines the damping force may also be effected:

the force R of the spring 13 tending to close the shutter;
the hydraulic force $(p_1-p_2)(S-s)$ tending to open it;
the hydraulic force $(p_1-p_4)s$ tending to open it.

It thus appears important to maintain the term $(S-s)$ as constant as possible from one shock absorber to another in order to prevent a variation being transferred directly to the damping force.

In the embodiment of FIG. 5, the use of an additional piston 65 fixed to the end of the rod 64 of the shutter 11 enables a precise definition of the cross-section s to be obtained.

However, difficulties may be encountered in such an embodiment in producing the leaktightness which must be total between the chamber 15a filled with oil and the reference chamber 66 filled with gas. In the embodiment illustrated in FIG. 5, this leaktightness is ensured by a seal mounted at the periphery of the additional piston 65. However, this structure brings about a certain friction and which can in certain cases have an adverse effect on the operating of the device. In order to resolve this difficulty, the replacement of the additional piston 65 by a flexible membrane, thus eliminating any friction, may be envisaged. However, such a membrane does not make it possible accurately to define the fluid volume displaced, that is to say the cross-section s of the equivalent piston.

Figure 6:
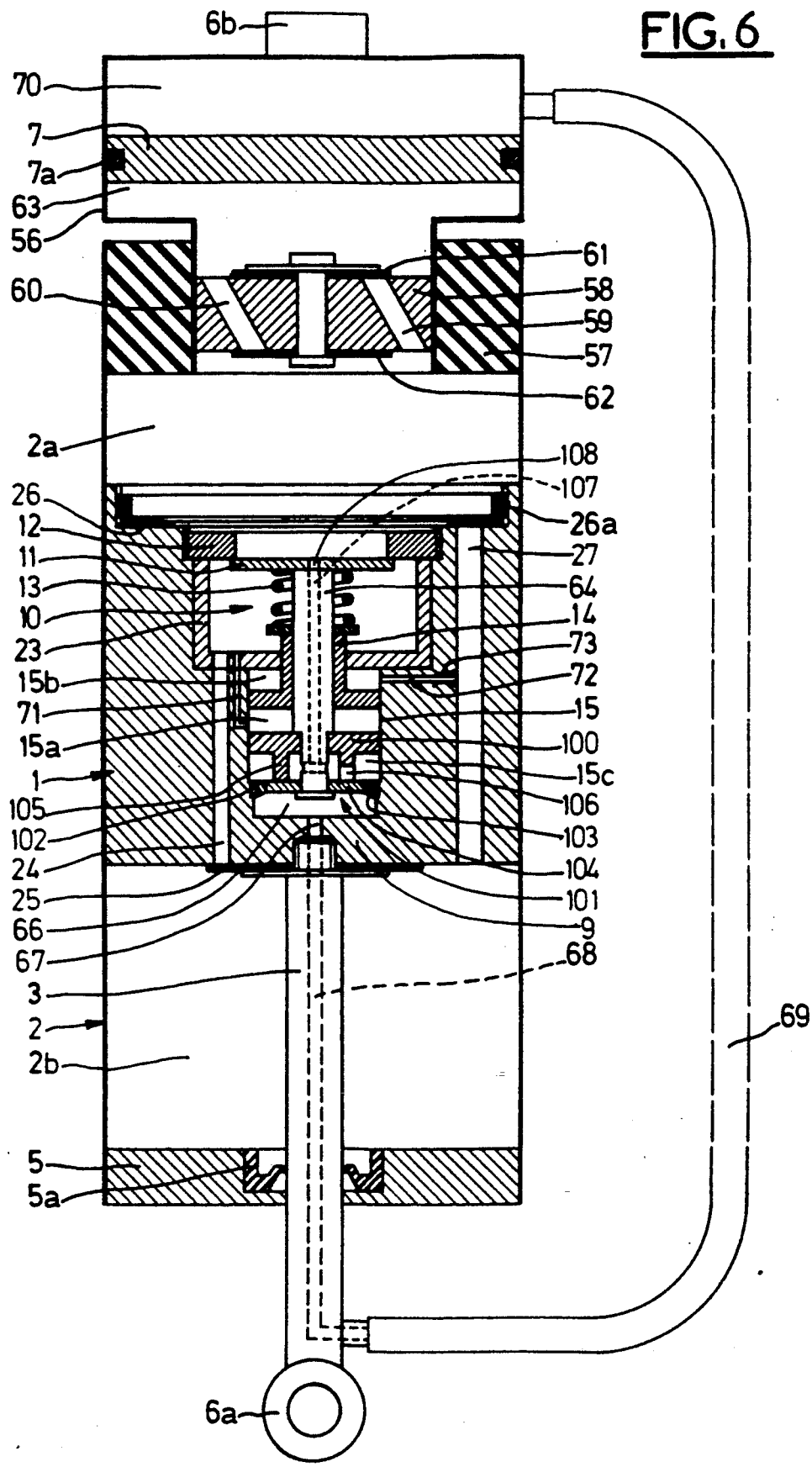
FIG. 6 is a diagrammatic cross-sectional view of a variant of the shock absorber in FIG. 5.

The variant illustrated in FIG. 6 enables these difficulties to be resolved by the use of a membrane and of an additional piston combined, thus making it possible for advantages to be obtained in the sealing of the membrane and in the geometric accuracy of the additional piston.

In FIG. 6, the identical elements bear the same references as in FIG. 5. FIG. 6 differs only from FIG. 5 through the replacement of the additional piston 65 equipped with a seal by an additional piston, designated 100, without a seal, and an assembly, designated 101, playing the part of a flexible membrane. The assembly 101 comprises an outer metal ring 102 crimped in the cylinder 15, a flexible ring 103, made for example of rubber or a similar material, and a rigid central washer 104 secured to the rod 64 of the shutter 11. A third chamber 15c is defined between the rigid washer 104 and the additional piston 100 also secured to the rod 64, the distance between the additional piston 100 and the rigid washer 104 being maintained by a cylindrical spacer 105 equipped with perforations 106. The third chamber 15c is filled with hydraulic fluid and is in communication with the first principal chamber 2a of the shock absorber, via the axial drilling 107 made in the rod 64 and the drilling 108 made in the shutter 11.

If the cross-section of the assembly 101 is now defined by s' while s is the cross-section of the additional piston 100, the forces acting on the shutter 11 in FIG. 6 are as follows:

the force R of the spring 13 tending to close the shutter;
the hydraulic force $(p_1-p_2)S$ tending to open it;
the hydraulic force $(p_1-p_2)s$ tending to close it;
the hydraulic force $(p_1-p_4)s'$ tending to open it.

The first two hydraulic forces may be combined in the form of a single hydraulic force $(p_1-p_2)(S-s)$ tending to open the shutter.

The functioning is then comparable with the embodiment in FIG. 5, the term $(p_1-p_4)s$ being replaced by the term $(p_1-p_4)s'$. The use of the assembly 101 forming the flexible membrane eliminates any friction while operating. Moreover, the term $(S-s)$ is perfectly defined geometrically from one shock absorber to another. The imprecision on the action of the piloting pressure $(p_1-p_4)s'$ remains acceptable.

Moreover, an excellent stability of the valve, which is given by the condition $s < S$ or $(S-s) > 0$ is obtained, it being possible for this condition to be produced independently of the value of s', which may be less, equal or greater than s. The action of the piloting pressure $(p_1-p_4)$ created by the valve 61 may be notably reinforced if $s' > s$ is chosen, the piloting pressure acting over a greater surface area.

Figure 7:
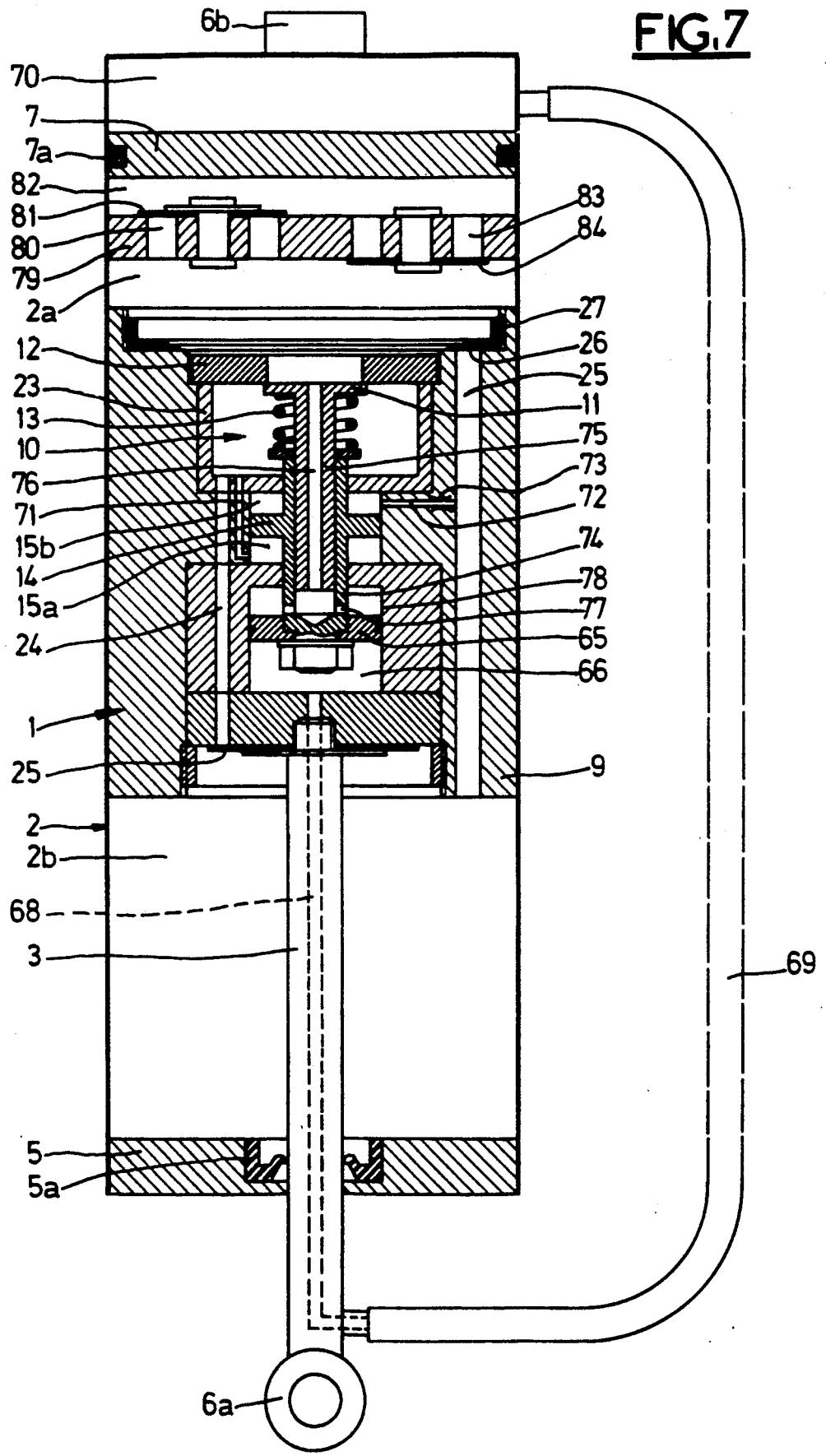
FIG. 7 a cross-sectional view of another variant of FIG. 5.

The variant in FIG. 7, in which the identical elements bear the same references, differs from that in FIG. 5 through the fact that the gas pressure within the reference chamber 66 is here exerted no longer directly on the shutter 11 as in the embodiment in FIG. 5, but on the piston 14.

To this end, in the embodiment illustrated in FIG. 6, the additional piston 65 is mounted at the end of an extension 74 secured to the piston 14. The extension 74 is tubular and it receives, in a sliding fashion, a central rod 75 secured to the shutter 11. The rod 75 additionally has an axial passage 76 which passes through the shutter 11 and which enables communication via passages 77 of the extension 74 with a cylindrical housing 78 situated on the inside of the piston body 9 and performing the function of a cylinder for the displacement of the additional piston 65. In other words, the housing 78 defines in its lower part the reference chamber 66 which is in communication, as in the embodiment in FIG. 5, with the upper part 70 filled with a gas, such as air, of the reservoir of the shock absorber, which is here constituted by the upper part of the cylinder 2.

The communications of hydraulic fluid with the chambers 15a and 15b are identical to those illustrated in FIG. 5.

In this embodiment, the gas pressure in the reference chamber 66 therefore acts on the piston 14, thus modifying the stress of the spring 13.

The structure of the shock absorber is completed in this embodiment by an upper closing piece 79 closing the first chamber 2a and comprising passages 80 cooperating with a non-return valve 81 defining a control restriction for the passage of the fluid from the first chamber 2a to the part 82 of the reservoir filled with hydraulic fluid, during a compression movement. The closing piece 79 in addition comprises passages 83 cooperating with a non-return valve 84 for the passage of the hydraulic fluid in the other direction only, during a pressure-reducing movement.

As in the embodiment in FIG. 5, the valve 10 according to the invention is here mounted in such a way as to play the role of a pilot-operated control valve, thus bringing about a decrease in the damping force beyond a compression speed limit of the rod 3, as explained in the abovementioned European patent.

In the embodiment of FIG. 7, the reference chamber 66 is delimited by the additional piston 65. It will be understood that such a structure could be modified by replacing the movable piston 65 by a flexible membrane delimiting the reference chamber 66. Since this element does not act directly on the shutter 11, the use thereof, which eliminates the friction of the movable piston 65, does not have the disadvantages which have been resolved by the variant in FIG. 6.

In the embodiment of FIG. 7, the additional force acting on the auxiliary piston 65 tends to decrease the tension of the spring 13 at the high push-in speeds of the rod.

By varying the respective characteristics of the non-return valves 25 and of the valves 61 or 81 defining the control restriction pilot-operating the valve, it is possible to fashion, as desired, the characteristics of the shock absorber during a compression movement. In practice, the restriction constituted by the non-return valve 25 acts from low compression speeds onwards, causing the damping force to increase, then the pressure drop across the non-return valve 25 increases very little whereas the pressure drop across the non-return valve 61 or 81 continues to increase in order to act in the opposite direction.

It will be noted that, in the embodiment in FIG. 7, it would also be possible to envisage mounting an elastomer elastic unit similar to the unit 57 illustrated in FIGS. 5 and 6.

I claim:

1. A valve assembly, comprising,
a seat,
a shutter engageable against said seat,
a spring urging said shutter against said seat to limit the flow rate of a hydraulic fluid passing through said valve assembly,
a cylinder,
a movable piston in said cylinder to define two chambers, means on said piston bearing against said spring,
a first said chamber being in communication with hydraulic fluid which is downstream of the valve assembly and being disposed so that pressure of hydraulic fluid therein tends to decrease the force exerted by said spring on said shutter,
an intermediate space which has a first passage orifice delimited by said shutter through which hydraulic fluid can enter, said intermediate space also having a second passage orifice provided with a restriction means which produces a pressure drop which increases with the flow rate passing therethrough from the intermediate space,
a second said chamber being in communication with said intermediate space so that force exerted by the spring on the valve varies as a function of the flow rate through the valve.

2. A shock absorber comprising the valve assembly according to claim 1 having a filtering restriction in the communication of hydraulic fluid with at least one of said chambers.

3. A shock absorber comprising the valve assembly according to claim 2 wherein said filtering restriction includes a non-return valve.

4. A valve assembly, comprising,
a seat,
a shutter engageable against said seat,
a spring urging said shutter against said seat to limit the flow rate of a hydraulic fluid passing through said valve assembly,
a cylinder,
a movable piston in said cylinder to define two chambers, means on said piston bearing against said spring,
a first said chamber being in communication with hydraulic fluid which is upstream of the valve assembly and being disposed so that pressure of hydraulic fluid therein tends to increase the force exerted by said spring on said shutter,
an intermediate space which has a first passage orifice delimited by said shutter through which hydraulic fluid can escape, said intermediate space also having a second passage orifice provided with a restriction means which produces a pressure drop which increases with the flow rate passing therethrough toward the intermediate space,
a second said chamber being in communication with said intermediate space so that force exerted by the spring on the valve varies as a function of the flow rate through the valve.

5. A shock absorber comprising the valve assembly according to claim 4 having a filtering restriction in the communication of hydraulic fluid with at least one of said chambers.

6. A shock absorber comprising the valve assembly according to claim 5 wherein said filtering restriction includes a non-return valve.

7. A shock absorber usable as a damping device for a motor vehicle, comprising,
a main cylinder containing a hydraulic fluid,
a rod,
a main piston actuated by said rod and defining a first main chamber and a second main chamber in the main cylinder,
a valve assembly comprising the following:
a seat,
a shutter engageable against said seat,
a spring urging said shutter against said seat to limit the flow rate of a hydraulic fluid passing through said valve assembly from one main chamber to another main chamber of the main cylinder,
an auxiliary cylinder,
a movable auxiliary piston in said auxiliary cylinder to define two chambers, means on said auxiliary piston bearing against said spring,
a first said auxiliary chamber being in communication with hydraulic fluid which is downstream of the valve assembly and being disposed so that pressure of hydraulic fluid therein tends to decrease the force exerted by said spring on said shutter,
an intermediate space which has a first passage orifice delimited by said shutter through which hydraulic fluid can enter, said intermediate space also having a second passage orifice provided with a restriction means which produces a pressure drop which increases with the flow rate passing therethrough from the intermediate space,
a second said auxiliary chamber being in communication with said intermediate space so that force exerted by the spring on the valve varies as a function of the flow rate through the valve.

8. A shock absorber according to claim 7 having a filtering restriction in the communication of hydraulic fluid with at least one of said auxiliary chambers.

9. A shock absorber according to claim 8 wherein said filtering restriction includes a non-return valve.

10. A shock absorber according to claim 7 having a shock absorber body in which the valve is mounted.

11. A shock absorber according to claim 10 in which the valve is mounted in said main piston.

12. A shock absorber according to claim 7 which includes a floating piston mounted in the first main chamber.

13. A shock absorber according to claim 7 wherein the valve is mounted at one end of the main cylinder, an outer casing surrounding the main cylinder to define an annular reservoir between the main cylinder and the outer casing.

14. A shock absorber according to claim 7 having a fluid reservoir which is communicable with the first main chamber.

15. A shock absorber according to claim 14 provided with a control restriction arranged between the first main chamber and the reservoir, means including a reference gas at substantially constant pressure for subjecting the shutter of the valve to an additional force tending to close the valve, so as to bring about an opening of the valve in response to rapid compression movement of the rod.

16. A shock absorber according to claim 15 wherein the additional force is exerted directly on the shutter.

17. A shock absorber according to claim 15 wherein the additional force is exerted on the shutter via the spring.

18. A shock absorber according to claim 15 having a reference chamber which contains the reference gas, and a piston defining a movable wall of the reference chamber.

19. A shock absorber according to claim 15 wherein the reservoir partly contains gas at a pressure substantially equal to that of said reference gas.

20. A shock absorber according to claim 15 wherein an elastic unit is mounted in the shock absorber, said shock absorber being mounted by means of the elastic unit so the valve opens during rapid decompression movement of the rod.

21. A shock absorber according to claim 15 having a reference chamber which contains the reference gas, and a flexible membrane which defines a movable wall of the chamber.

22. A shock absorber according to claim 21 having an additional piston in which the shutter is secured, said additional piston being displaceable simultaneously with the flexible membrane in the chamber delimited by the auxiliary piston and being in communication with said intermediate space, a third chamber defined between the additional piston and the flexible membrane, said third chamber being in communication with the first main chamber of the shock absorber.

23. A shock absorber according to claim 22 having an auxiliary rod secured to the shutter, said additional piston being secured on said auxiliary rod, a rigid washer with a peripheral sealing ring engaging a wall of the reference chamber, said sealing ring being flexible and being operable as said membrane.

24. A shock absorber according to claim 23 wherein the auxiliary rod and the shutter are drilled to provide communication between the first main chamber and said third chamber.

25. A shock absorber usable as a damping device for a motor vehicle, comprising,
a main cylinder containing a hydraulic fluid,
a rod,
a main piston actuated by said rod and defining a first main chamber and a second main chamber in the main cylinder,
a valve assembly comprising the following:
a seat,
a shutter engageable against said seat,
a spring urging said shutter against said seat to limit the flow rate of a hydraulic fluid passing through said valve assembly from one main chamber to another main chamber of the main cylinder,
an auxiliary cylinder,
a movable auxiliary piston in said auxiliary cylinder to define two chambers, means on said auxiliary piston bearing against said spring,
a first said auxiliary chamber being in communication with hydraulic fluid which is upstream of the valve assembly and being disposed so that pressure of hydraulic fluid therein tends to increase the force exerted by said spring on said shutter,
an intermediate space which has a first passage orifice delimited by said shutter through which hydraulic fluid can escape, said intermediate space also having a second passage orifice provided with a restriction means which produces a pressure drop which increases with the flow rate passing therethrough toward the intermediate space, a second said auxiliary chamber being in communication with said intermediate space so that force exerted by the spring on the valve varies as a function of the flow rate through the valve.

26. A shock absorber according to claim 25 having a filtering restriction in the communication of hydraulic fluid with at least one of said auxiliary chambers.

27. A shock absorber according to claim 26 said filtering restriction includes a non-return valve.

28. A shock absorber according to claim 25 having a shock absorber body in which the valve is mounted.

29. A shock absorber according to claim 28 in which the valve is mounted in said main piston.

30. A shock absorber according to claim 25 which includes a floating piston mounted in the first main chamber.

31. A shock absorber according to claim 25 wherein the valve is mounted at one end of the main cylinder, an outer casing surrounding the main cylinder to define an annular reservoir between the main cylinder and the outer casing.

32. A shock absorber according to claim 25 having a fluid reservoir which is communicable with the first main chamber.

33. A shock absorber according to claim 32 provided with a control restriction arranged between the first main chamber and the reservoir, means including a reference gas at substantially constant pressure for subjecting the shutter of the valve to an additional force tending to close the valve, so as to bring about an opening of the valve in response to rapid compression movement of the rod.

34. A shock absorber according to claim 33 wherein the additional force is exerted directly on the shutter.

35. A shock absorber according to claim 33 wherein the additional force is exerted on the shutter via the spring.

36. A shock absorber according to claim 33 having a reference chamber which contains the reference gas, and a piston defining a movable wall of the reference chamber.

37. A shock absorber according to claim 33 wherein the reservoir partly contains gas at a pressure substantially equal to that of said reference gas.

38. A shock absorber according to claim 33 wherein an elastic unit is mounted in the shock absorber, said shock absorber being mounted by means of the elastic unit so the valve opens during rapid decompression m movement of the rod.

39. A shock absorber according to claim 33 having a reference chamber which contains the reference gas, and a flexible membrane which defines a movable wall of the chamber.

40. A shock absorber according to claim 39 having an additional piston in which the shutter is secured, said additional piston being displaceable simultaneously with the flexible membrane in the chamber delimited by the auxiliary piston and being in communication with said intermediate space, a third chamber defined between the additional piston and the flexible membrane, said third chamber being in communication with the first main chamber of the shock absorber.

41. A shock absorber according to claim 40 having an auxiliary rod secured to the shutter, said additional piston being secured on said auxiliary rod, a rigid washer with a peripheral sealing ring engaging a wall of the reference chamber, said sealing ring being flexible and being operable as said membrane.

42. A shock absorber according to claim 41 wherein the auxiliary rod and the shutter are drilled to provide communication between the first main chamber and said third chamber.

* * * * *